(12) United States Patent
Liu et al.

(10) Patent No.: US 10,898,974 B2
(45) Date of Patent: Jan. 26, 2021

(54) ABUTMENT, LASER CUTTING DEVICE AND CONTROL METHOD THEREOF

(71) Applicant: BOE TECHNOLOGY GROUP CO., LTD., Beijing (CN)

(72) Inventors: Lu Liu, Beijing (CN); Mingche Hsieh, Beijing (CN); Hejin Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 104 days.

(21) Appl. No.: 15/749,491

(22) PCT Filed: Jul. 20, 2017

(86) PCT No.: PCT/CN2017/093630
§ 371 (c)(1),
(2) Date: Jan. 31, 2018

(87) PCT Pub. No.: WO2018/059089
PCT Pub. Date: Apr. 5, 2018

(65) Prior Publication Data
US 2019/0337099 A1     Nov. 7, 2019

(30) Foreign Application Priority Data

Sep. 30, 2016  (CN) .......................... 2016 1 0877314

(51) Int. Cl.
*B23K 11/00*     (2006.01)
*B23K 26/38*     (2014.01)
*B23K 26/70*     (2014.01)

(52) U.S. Cl.
CPC ............ *B23K 26/38* (2013.01); *B23K 26/702* (2015.10)

(58) Field of Classification Search
CPC .............................. B23K 26/38; B23K 26/702
See application file for complete search history.

(56) References Cited

U.S. PATENT DOCUMENTS

| 6,984,803 B1 * | 1/2006 | Garnier | B23K 26/0853 |
| | | | 219/121.67 |
| 2005/0116396 A1 * | 6/2005 | LeMasson | B23K 26/702 |
| | | | 266/65 |

(Continued)

FOREIGN PATENT DOCUMENTS

| CN | 103732549 | 4/2014 |
| CN | 204308415 U | 5/2015 |

(Continued)

OTHER PUBLICATIONS

"International Search Report," PCT Application No. PCT/CN2017/093630 (Nov. 2, 2017).

(Continued)

*Primary Examiner* — Serkan Akar
*Assistant Examiner* — Ahmad Abdel-Rahman
(74) *Attorney, Agent, or Firm* — Womble Bond Dickinson (US) LLP

(57) ABSTRACT

The present disclosure relates to the field of display technologies, and provides an abutment, a laser cutting device and a control method thereof, so as to improve the yield rate and prolong the service life of a product. Specifically, the abutment comprises a carrying region. The carrying region is used for placing a component to be cut thereon, and comprises an adsorbing region and a cutting region. Furthermore, the adsorbing region is provided with adsorbing holes for adsorbing the component to be cut. Besides, the cutting region extends from a side of the carrying region to an opposite side thereof.

7 Claims, 5 Drawing Sheets

(56) References Cited

U.S. PATENT DOCUMENTS

2009/0268130 A1* 10/2009 Yeh .................. G02F 1/1339
                                                                                          349/73
2013/0167590 A1    7/2013 Teranishi et al.
2016/0274401 A1* 9/2016 Huang ................ G02F 1/1337
2017/0080548 A1* 3/2017 Xu .................... B25B 11/005

FOREIGN PATENT DOCUMENTS

| CN | 104759765 | 7/2015 |
| --- | --- | --- |
| CN | 105108355 | 12/2015 |
| CN | 205166195 | 4/2016 |
| CN | 106271113 | 1/2017 |
| JP | 2010030834 | 2/2010 |
| JP | 2014151347 | 8/2014 |
| JP | 2016022483 | 2/2016 |
| KR | 20100047923 | 5/2010 |

OTHER PUBLICATIONS

"First office action," CN Application No. 201610877314.9 (Jul. 31, 2017).

* cited by examiner

ABUTMENT, LASER CUTTING DEVICE AND CONTROL METHOD THEREOF

The present application is the U.S. national phase entry of PCT/CN2017/093630, with an international filling date of Jul. 20, 2017, which claims the priority of the Chinese patent application No. 201610877314.9 filed on Sep. 30, 2016, disclosures of both are incorporated herein by reference.

FIELD

The present disclosure relates to the field of display technologies, and more specifically to an abutment, a laser cutting device and a control method thereof.

BACKGROUND ART

With the development of display technologies, various display devices have come into people's lives. Typically, in the manufacture of a display device, it is necessary to cut a larger display substrate or display panel into pieces, so as to form smaller display substrates or display panels for the purpose of manufacturing the display device.

At present, the cutting process is mainly performed by laser cutting techniques. In laser cutting, a component to be cut will usually be fixed onto an abutment of a cutting device, and then cut by laser light emitted by a laser emitter. Generally, the abutment is provided with adsorbing holes which can adsorb the component to be cut onto the abutment due to existence of a negative pressure. As an example, the component to be cut can be a display substrate, a display panel, or a flexible display panel.

SUMMARY

Embodiments of the present disclosure provide an abutment, a laser cutting device and a control method thereof, so as to eliminate or at least alleviate one or more of the technical problems existing in the prior art.

According to an aspect of the present disclosure, an abutment is provided. The abutment comprises a carrying region. Specifically, the carrying region is used for placing a component to be cut thereon, and comprises an adsorbing region and a cutting region. Besides, the adsorbing region is further provided with adsorbing holes for adsorbing the component to be cut. Furthermore, the cutting region extends from a side of the carrying region to an opposite side thereof.

Optionally, the adsorbing holes in each adsorbing region are arranged uniformly.

Optionally, a distance between the cutting region and a center of an adsorbing hole in the adsorbing region close to the cutting region is greater than a radius of the adsorbing hole by at least 1 mm.

Optionally, the cutting region is also provided with further adsorbing holes, and all the adsorbing holes in the adsorbing region and the cutting region are arranged in rows and columns. In other words, all the adsorbing holes in the adsorbing region and the cutting region are arranged in lines both in a first direction and in a second direction, wherein the first direction and the second direction are orthogonal to each other. In this case, the abutment further comprises a peripheral region arranged at the periphery of the carrying region, and the peripheral region is provided with first retractable baffles and second retractable baffles. Optionally, the first retractable baffles and the second retractable baffles are both arranged at a side of the abutment away from the component to be cut. Specifically, a line of adsorbing holes in a first direction (i.e., a row of adsorbing holes) corresponds to a first retractable baffle. When a first retractable baffle is in an unfolded state, the line or row of adsorbing holes corresponding thereto is shielded. Similarly, a line of adsorbing holes in a second direction (i.e., a column of adsorbing holes) corresponds to a second retractable baffle. When a second retractable baffle is in an unfolded state, the line or column of adsorbing holes corresponding thereto is shielded.

Also optionally, each of the first retractable baffles comprises a plurality of first sub-retractable baffles connected in series, and adjacent ones of the first sub-retractable baffles are connected with each other via a first connection structure. This means that the plurality of first sub-retractable baffles connected in series can move along the first direction by means of the first connection structure. Similarly, each of the second retractable baffles comprises a plurality of second sub-retractable baffles connected in series, and adjacent one of the second sub-retractable baffles are connected with each other via a second connection structure. In other words, the plurality of second sub-retractable baffles connected in series can move along the second direction by means of the second connection structure.

Optionally, all the adsorbing holes in the adsorbing region and the cutting region are arranged uniformly.

Optionally, the first retractable baffles and the second retractable baffles are all arranged on an outer surface of the abutment.

Optionally, all of the first retractable baffles and the second retractable baffles have a width of smaller than 10 mm According to another aspect of the present disclosure, a laser cutting device is provided. The laser cutting device comprises the abutment according to any of the previous embodiments, and a laser emitter.

According to yet another aspect of the present disclosure, a method for controlling a laser cutting device is provided. Specifically, an abutment of the laser cutting device comprises a carrying region and a peripheral region, wherein the carrying region further comprises an adsorbing region and a cutting region. The carrying region is used for placing a component to be cut thereon, and the peripheral region is provided with first retractable baffles and second retractable baffles. As mentioned above, each of the first retractable baffles is used for shielding a corresponding row of adsorbing holes in an unfolded state, and each of the second retractable baffles is used for shielding a corresponding column of adsorbing holes in an unfolded state. Here, the control method comprises: unfolding at least one of the first retractable baffles and the second retractable baffles to shield a corresponding row and/or column of adsorbing holes in the cutting region; and cutting by a laser emitter the component to be cut along the cutting region.

BRIEF DESCRIPTION OF THE DRAWINGS

In order to illustrate technical solutions in the embodiments of the present disclosure more clearly, drawings to be used in depictions of the embodiments will be briefly introduced as follows. Apparently, drawings in the following depictions are only representative of some embodiments of the present disclosure. For a person having ordinary skills in the art, other embodiments can also be obtained from these drawings without any inventive effort.

DETAILED DESCRIPTION OF THE EMBODIMENTS

Figure 1:
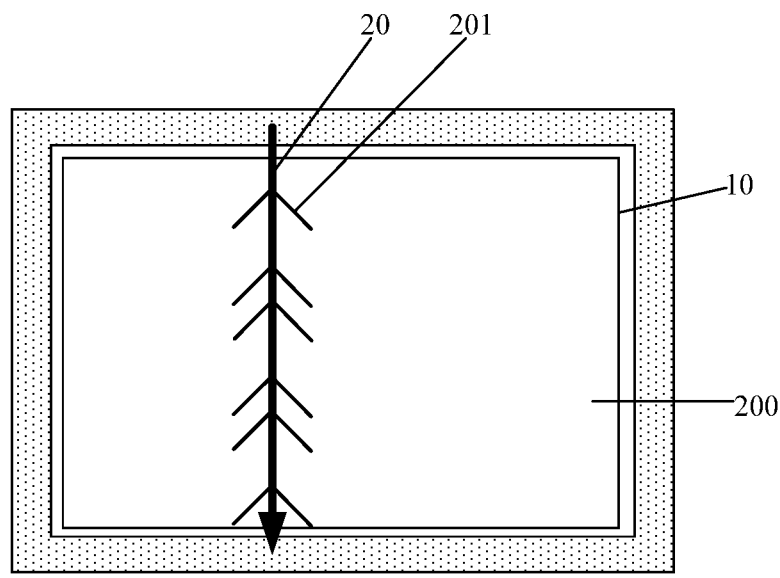
FIG. 1 shows a schematic structure view of a conventional abutment.

Technical solutions in the embodiments of the present disclosure shall be described clearly and completely as follows with reference to the drawings in the embodiments of the present disclosure. Apparently, the embodiments described below are only part of the embodiments of the present disclosure, rather than all of them. Based on the embodiments in the present disclosure, all other embodiments obtainable by a person having ordinary skills in the art without any inventive effort shall fall within the protection scope of the present disclosure.

In the drawings, various components according to the embodiments of the present disclosure are respectively indicated by reference signs as follows: 01—carrying region; 02—peripheral region; 100—abutment; 200—component to be cut; 10—adsorbing hole; 20—cutting line; 201—stress crack; 30—adsorbing region; 40—cutting region; 51—first retractable baffle; 511—first sub-retractable baffle; 512—connection structure; 52—second retractable baffle; and 521—second sub-retractable baffle.

Referring to FIG. 1, a schematic structure view of a conventional abutment is shown. As can be seen from the drawing, in case of cutting by laser light, when a cutting line 20 (indicated by an arrow in FIG. 1) passes through an adsorbing hole 10, due to the existence of a negative pressure at the adsorbing hole 10, a force generated by the negative pressure will cause defects such as a stress crack 201 in a component 200 to be cut at the cutting line 20, which reduces the yield rate. Besides, the component 200 to be cut is uneven at the defect position, and thereby a weak point is formed. In this case, during subsequent uses, the stress crack 201 will continuously extend from the defect position, which finally leads to a failure of the component. For a display device with a narrow frame, the stress crack 201 can easily extend to the display region and lead to a failure of the component, because the frame seldom shields the component, thereby shortening the service life of a product.

Figure 2:
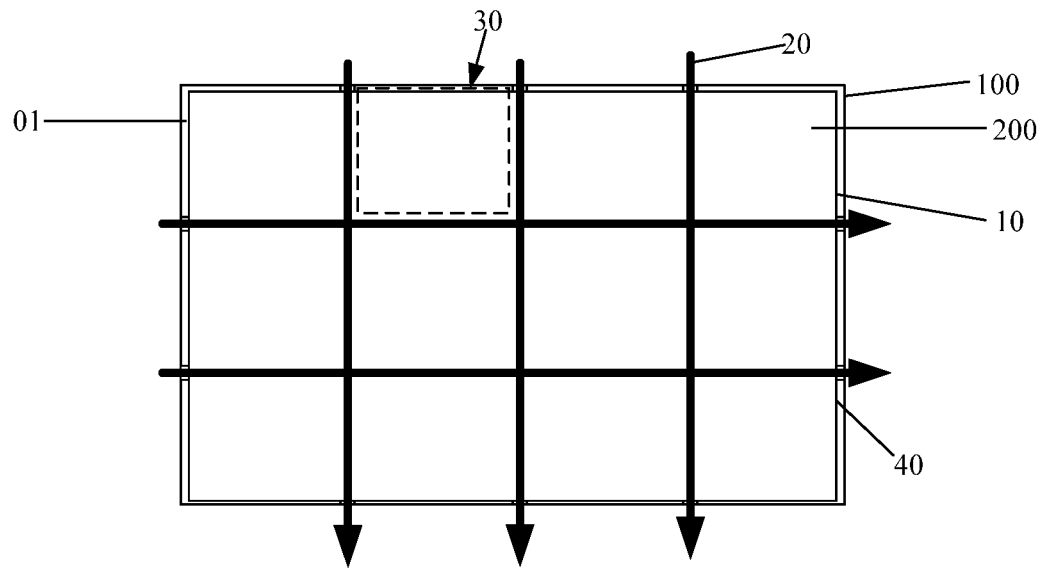
FIG. 2 shows a plan view of an abutment according to an embodiment of the present disclosure.

To this end, an embodiment of the present disclosure provides an abutment 100. As shown in FIG. 2, the abutment 100 comprises a carrying region 01, and the carrying region 01 is used for placing the component 200 to be cut thereon. Besides, the carrying region 01 further comprises an adsorbing region 30 (a region indicated by a dashed box in FIG. 2) and a cutting region 40. Furthermore, the adsorbing region 30 is further provided with adsorbing holes 10 for adsorbing the component 200 to be cut thereon. Moreover, as shown in the drawing, the cutting region 40 extends from a side of the carrying region 01 to an opposite side thereof.

It should be noted that the position of the cutting region 40 can be selected based on independent units comprised in the component 200 to be cut, wherein the purpose is to cut out as many independent units in the component 200 to be cut as possible.

For example, as shown in FIG. 2, the component 200 to be cut comprises 12 independent units. In this case, by configuring the carrying region to comprise three cutting regions 40 in a vertical direction and three cutting regions 40 in a horizontal direction, it is ensured that all 12 independent units can be cut out.

Those skilled in the art should understand that the laser cutting device generally cuts the component 200 to be cut along the cutting region 40. Therefore, the adsorbing region 30 and the cutting region 40 are typically spaced apart from each other.

Besides, it should be further noted that arrangements of the adsorbing holes 10 within the adsorbing region 30 can be selected flexibly upon actual needs, and the adsorbing holes 10 as shown in FIG. 2 are only schematically arranged.

Moreover, there can be many choices for the aperture of the adsorbing hole 10, as long as the abutment 100 can adsorb, via the adsorbing hole 10, the component 200 to be cut.

It should be further pointed out that the laser cutting device generally cuts the component 200 to be cut along the cutting region 40. In other words, as shown in FIG. 2, laser light emitted from the laser cutting device cuts the component 200 to be cut along a preset route inside the cutting region 40. The preset route is also called a cutting line 20 in an embodiment of the present disclosure. Since the cutting line 20 is located within the cutting region 40, no negative pressure will be generated at the cutting line 20, if the cutting region 40 does not adsorb the component 200 to be cut.

Furthermore, it should be further understood that as an example, the component 200 to be cut can be a display substrate, a display panel, a flexible display panel, and so on.

According to an embodiment of the present disclosure, an abutment 100 is provided. Specifically, a cutting region 40 is arranged in a carrying region 01 of the abutment 100. In particular, the cutting region 40 is enabled to have no adsorption of a component 200 to be cut. In this way, when the component 200 to be cut is cut along a cutting line in the cutting region 40 by laser light emitted from a laser emitter in a laser cutting device, no force due to a negative pressure will be generated at the cutting line 20. Accordingly, at the cutting line 20, no stress crack defect will be introduced by the negative pressure force into the component 200 to be cut. Thereby, the yield rate can be improved, and the service life of the product can be prolonged.

In order to adsorb the component 200 to be cut steadily onto the abutment 100 and avoid cutting errors, optionally in an embodiment of the present disclosure, the adsorbing holes 10 in each adsorbing region 30 are further arranged uniformly, as shown in FIG. 2. In other words, the adsorbing holes 10 are provided only within the adsorbing region 30, and further arranged uniformly.

Figure 3:
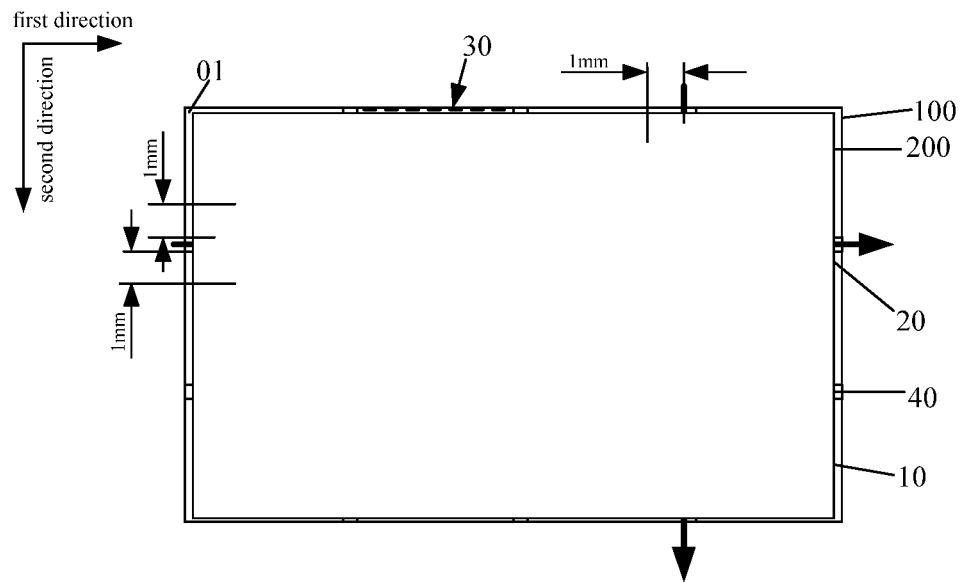
FIG. 3 shows a plan view of an abutment according to another embodiment of the present disclosure.

Furthermore, as shown in FIG. 3, a distance between the cutting region 40 and a center of an adsorbing hole 10 in the adsorbing region 30 close to the cutting region 40 is greater than a radius of the adsorbing hole 10 by at least 1 mm. In other words, no adsorbing hole 10 is provided within the cutting region 40, and no adsorbing hole 10 is arranged within a range of less than 1 mm at respective sides of the cutting region 40.

As shown in FIG. 3, no adsorbing hole 10 is arranged within a range of less than 1 mm at respective sides of the cutting region 40, no matter whether the cutting line 20 is located in the middle of the cutting region 40 (a preset cutting line 20 extending in a first direction), or at the edge of the cutting region 40 (a preset cutting line 20 extending in a second direction).

It should be noted that in an embodiment of the present disclosure, the distance between the center of the adsorbing hole 10 and the cutting region 40 should be understood as a rectilinear distance between a circle center of the adsorbing hole 10 and an edge of the cutting region 40 close to this adsorbing hole 10.

In consideration of the laser cutting accuracy and the thermal influence, in an embodiment of the present disclosure, the distance between the adsorbing hole 10 and the cutting region 40 can be greater than the radius of the adsorbing hole 10 by at least 1 mm. In this way, it can be better ensured that the cutting position is not influenced by the force due to a negative pressure, when the laser emitter cuts the component 200 to be cut.

Figure 4A:
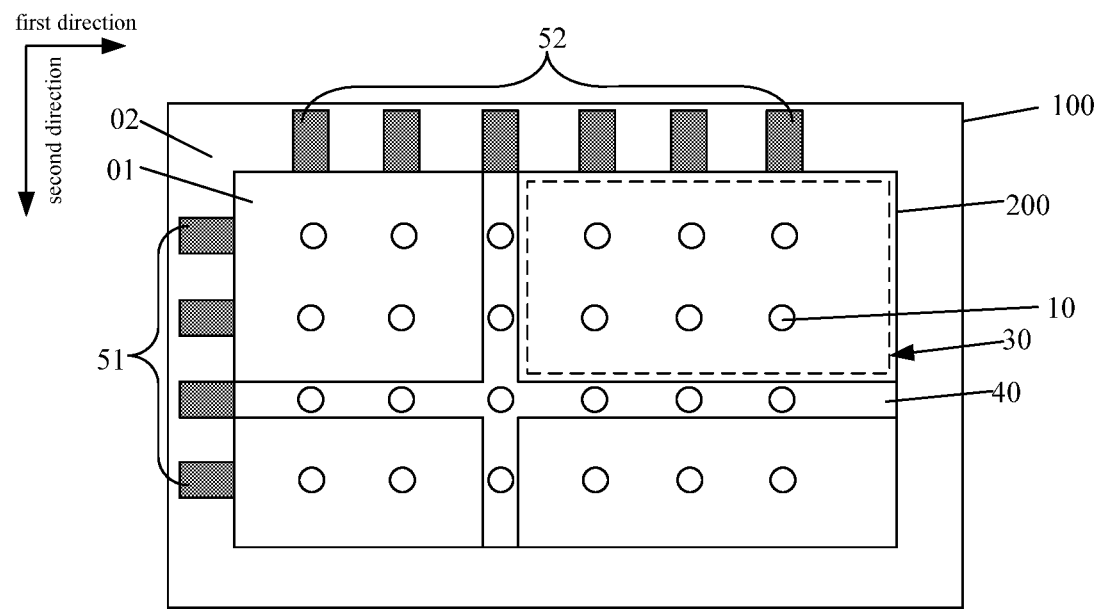
FIG. 4(a) shows a plan view of an abutment according to yet another embodiment of the present disclosure.
Figure 4B:
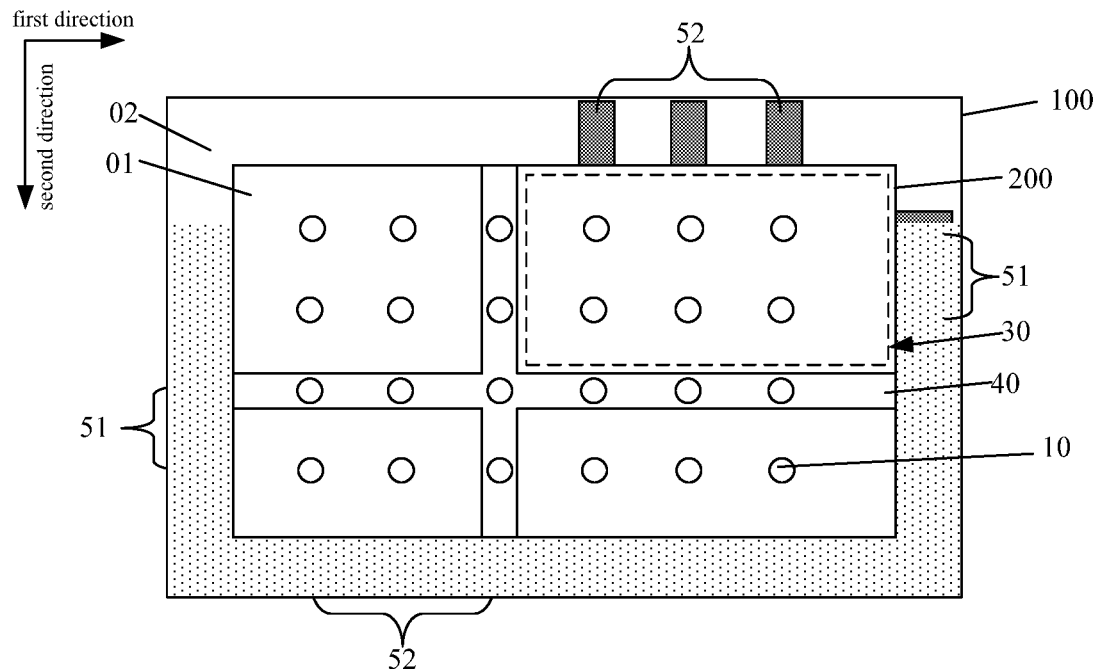
FIG. 4(b) shows a plan view of an abutment according to still another embodiment of the present disclosure.

Also optionally, as shown in FIGS. 4(a) and 4(b), the cutting region 40 is further provided with adsorbing holes 10. In this case, all the adsorbing holes 10 in the adsorbing region 30 and the cutting region 40 are arranged in lines in a first direction and also in a second direction, wherein the first direction and the second direction are orthogonal to each other. In other words, all the adsorbing holes 10 in the adsorbing region 30 and the cutting region 40 can be arranged in rows and columns, wherein rows are indicated by a first direction in the drawing, and columns are indicated by a second direction in the drawing. Besides, the abutment 100 further comprises a peripheral region 02 arranged at the periphery of the carrying region 01, and the peripheral region 02 is further provided with first retractable baffles 51 and second retractable baffles 52. Specifically, the first retractable baffles 51 and the second retractable baffles 52 are all arranged at a side of the abutment 100 away from the component 200 to be cut.

Figure 5:
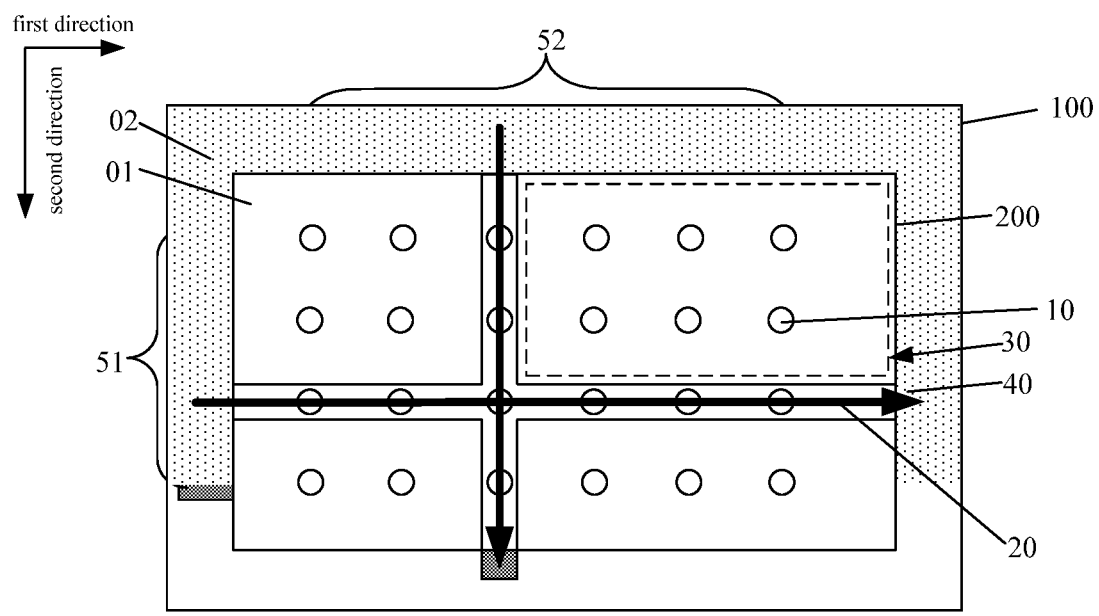
FIG. 5 shows a plan view of an abutment according to other embodiments of the present disclosure.

In an example, as shown in FIG. 5, any line (i.e., any row) of adsorbing holes 10 arranged in the first direction corresponds to a first retractable baffle 51. Moreover, when the first retractable baffle 51 is in an unfolded state, the corresponding line or row of adsorbing holes 10 will be shielded. Similarly, as shown in FIG. 5, any line (i.e., any column) of adsorbing holes 10 arranged in the second direction corresponds to a second retractable baffle 52. In this case, if the second retractable baffle 52 is in an unfolded state, the corresponding line or column of adsorbing holes 10 will be shielded.

It should be noted that the adsorbing holes 10 are also provided within the cutting region 40. This means that the adsorbing holes 10 are arranged within the entire carrying region 01. Besides, such adsorbing holes 10 are further arranged in lines in the first direction and also in the second direction. In addition, although the first direction and the second direction are shown as perpendicular to each other in FIGS. 4(a), 4(b) and 5, this does not limit the present disclosure in any sense. Essentially, according to an embodiment of the present disclosure, the first direction and the second direction can be selected flexibly upon specific needs.

Moreover, it should be further pointed out that there can be various choices for specific positions of the first retractable baffles 51 and the second retractable baffles 52 within the peripheral region 02, as long as a retractable baffle corresponds to a line of adsorbing holes 10. For example, they can be arranged either with reference to the case of FIG. 4(a), or with reference to the case of FIG. 4(b). Obviously, they can also be arranged in any other suitable ways.

Those skilled in the art should understand that as shown in FIG. 5, the first retractable baffles 51 are used for shielding a line of adsorbing holes 10 arranged in the first direction, i.e., the first retractable baffles 51 are retractable in the first direction. Similarly, the second retractable baffles 52 are used for shielding a line of adsorbing holes 10 arranged in the second direction, i.e., the second retractable baffles 52 are retractable in the second direction.

Besides, although the first retractable baffles 51 and the second retractable baffles 52 are all arranged at a side of the abutment 100 away from the component 200 to be cut in the drawing, the present disclosure is not limited thereto. Essentially, the only condition is that the first retractable baffles 51 and the second retractable baffles 52 can shield corresponding adsorbing holes 10 in the cutting region 40, when they are in an unfolded state. Moreover, specific structures and materials for the first retractable baffles 51 and the second retractable baffles 52 can also be selected flexibly, as long as the baffles are retractable flexibly.

Furthermore, as shown in FIG. 5, when the component 200 to be cut is cut by a laser cutting device, the retractable baffles corresponding to the cutting region 40 are in an unfolded state, while the retractable baffles at other positions are still in a folded state.

According to an embodiment of the present disclosure, by arranging a plurality of first retractable baffles 51 and second retractable baffles 52 in the peripheral region 02, the cutting region 40 on the abutment 100 can be adjusted flexibly in position. During the production process, if the cutting position is determined upon actual needs, the first retractable baffles 51 and the second retractable baffles 52 corresponding to this cutting position can be unfolded, such that the retractable baffles in an unfolded state can shield a line of adsorbing holes 10 corresponding thereto. In this way, the cutting region 40 will not adsorb the component 200 to be cut, which ensures that the cutting position is not influenced by any force due to the negative pressure. In contrast, the first retractable baffles 51 and the second retractable baffles 52 at other positions are still in a folded state, which ensures that the abutment 100 can still adsorb the component 200 to be cut. In this case, the quality of the cut edges and the adsorbing stability of the abutment 100 with respect to the component 200 to be cut can be both ensured.

Figure 6A:
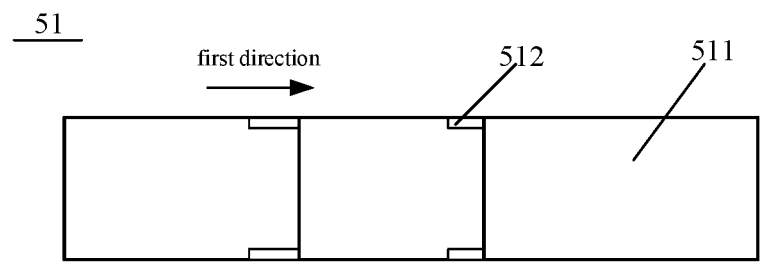
FIG. 6(a) shows a schematic structure view of a first retractable baffle according to an embodiment of the present disclosure.

Optionally, as shown in FIG. 6(a), the first retractable baffles 51 comprise a plurality of first sub-retractable baffles 511 connected in series, and adjacent ones of the first sub-retractable baffles 511 are connected with each other via a first connection structure 512. Thereby, the plurality of first sub-retractable baffles 511 connected in series can move along the first direction by means of the first connection structure 512.

Figure 6B:
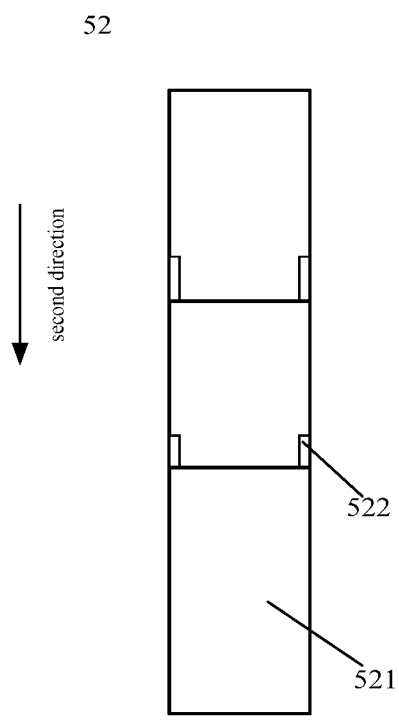
FIG. 6(b) shows a schematic structure view of a second retractable baffle according to an embodiment of the present disclosure.

Similarly, as shown in FIG. 6(b), the second retractable baffles 52 can also comprise a plurality of second sub-retractable baffles 521 connected in series, and adjacent ones of the second sub-retractable baffles 521 are connected with each other via a second connection structure 522. Thereby, the plurality of second sub-retractable baffles 521 connected in series can move along the second direction by means of the second connection structure 522.

It should be pointed out that specific structure for the connection structure 512 can be selected flexibly, as long as each sub-baffle can move along a corresponding direction. As an example, the connection structure 512 can be a U-shaped slot.

Besides, the first retractable baffle 51 and the second retractable baffle 52 can all have the same structure. In this case, a suitable number of sub-retractable baffles can be selected according to the shape of the abutment 100.

According to an embodiment of the present disclosure, the first retractable baffles 51 and the second retractable baffles 52 are arranged in a pull-out manner That is, they comprise a plurality of sub-retractable baffles connected in series. This not only saves the space for arranging the first retractable baffles 51 and the second retractable baffles 52, but also enables flexible retractions of the first retractable baffles 51 and the second retractable baffles 52 upon actual needs.

Optionally, as shown in FIGS. 4(*a*), 4(*b*) and 5, all the adsorbing holes 10 in the adsorbing region 30 and the cutting region 40 are arranged uniformly. That is, the adsorbing holes 10 within the carrying region 01 are all arranged in a uniform way.

According to an embodiment of the present disclosure, by distributing the adsorbing holes 10 uniformly in the adsorbing region 30 and the cutting region 40, the component 200 to be cut can be adsorbed onto the abutment 100 more steadily via the adsorbing holes 10, thereby avoiding cutting errors.

Also optionally, the first retractable baffles 51 and the second retractable baffles 52 are all arranged on an outer surface of the abutment 100. In this case, the first retractable baffles 51 and the second retractable baffles 52 can be deployed in various fixing manners on an outer side of the abutment 100 away from the component 200 to be cut, as long as the abutment 100 can be placed steadily.

According to an embodiment of the present disclosure, the first retractable baffles 51 and the second retractable baffles 52 are all arranged on an outer side of the abutment 100 away from the component 200 to be cut. This not only facilitates fixations of the first retractable baffles 51 and the second retractable baffles 52, but also shields the adsorbing holes 10 better.

As an example, the adsorbing hole 10 generally has an aperture of 2-5 mm. In view of this, according to an embodiment of the present disclosure, all of the first retractable baffle 51 and the second retractable baffle 52 have optionally a width of smaller than 10 mm According to an embodiment of the present disclosure, widths of the first retractable baffle 51 and the second retractable baffle 52 are all arranged to be smaller than 10 mm. In this way, the adsorbing holes 10 in the cutting region 40 can be shielded, when the first retractable baffles 51 and the second retractable baffles 52 are unfolded. In the meanwhile, the number of adsorbing holes 10 can be made sufficient large, for ensuring the adsorbing stability with respect to the component 200 to be cut.

According to an embodiment of the present disclosure, a laser cutting device is further provided. The laser cutting device can comprise the abutment 100 and a laser emitter. It should be pointed out that the laser emitter can emit various types of laser light. As an example, it can emit either UV laser light or carbon dioxide laser light.

According to an embodiment of the present disclosure, a laser cutting device is provided. Specifically, in the laser cutting device, a cutting region 40 is arranged in a carrying region 01 of the abutment 100. In particular, the cutting region 40 is also enabled to not adsorb the component 200 to be cut. In this way, when the component 200 to be cut is cut along a cutting line in the cutting region 40 by laser light emitted from a laser emitter in the laser cutting device, no force due to a negative pressure will be generated at the cutting line 20. Accordingly, at the cutting line 20, no stress crack defect will be introduced by the negative pressure force into the component 200 to be cut. Thereby, the yield rate can be improved, and the service life of the product can be prolonged.

Figure 7:
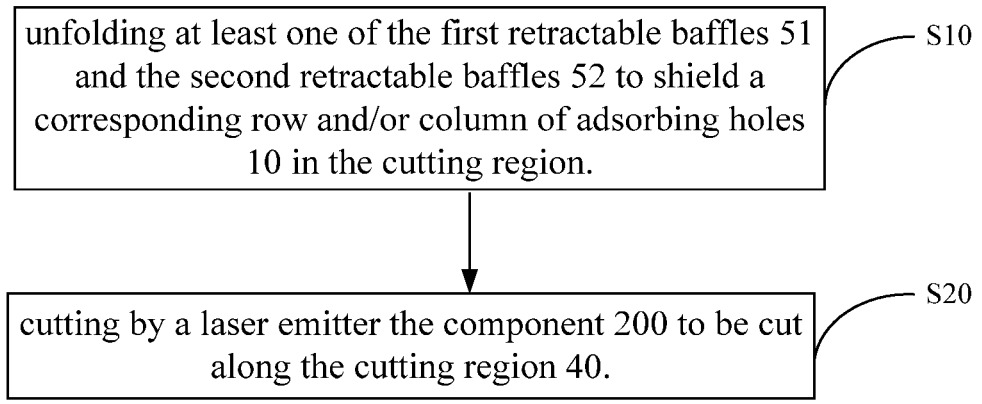
FIG. 7 shows a flow diagram of a method for controlling a laser cutting device according to an embodiment of the present disclosure.

According to an embodiment of the present disclosure, a method for controlling a laser cutting device is further provided. As shown in FIGS. 4(*a*), 4(*b*) and 5, in the laser cutting device, the abutment 100 comprises a carrying region 01 and a peripheral region 02, and the carrying region 01 further comprises an adsorbing region 30 and a cutting region 40. Besides, a component 200 to be cut is further placed in the carrying region 01, and the peripheral region 02 is provided with first retractable baffles 51 and second retractable baffles 52. As shown in FIG. 7, the control method comprises steps as follows.

S10, unfolding at least one of the first retractable baffles 51 and the second retractable baffles 52 to shield a corresponding row and/or column of adsorbing holes 10 in the cutting region.

Specifically, during the production process, which ones of the first retractable baffles 51 and the second retractable baffles 52 are to be unfolded can be determined according to the independent units comprised in the larger component 200 to be cut. In this case, the first retractable baffles 51 and the second retractable baffles 52 at a position corresponding to a non-cutting region still remain in a folded state.

S20, cutting by a laser emitter the component 200 to be cut along the cutting region 40.

According to an embodiment of the present disclosure, a method for controlling a laser cutting device is provided. Specifically, before the component 200 to be cut is cut by the laser emitter along the cutting region 40, the first retractable baffles 51 and/or the second retractable baffles 52 located in the peripheral region 02 of the abutment 100 are unfolded, such that the retractable baffles in an unfolded state can shield a corresponding line of adsorbing holes 10. This ensures that no force due to a negative pressure will be generated at the position of cutting line 20. Accordingly, at the position of cutting line, no stress crack will be caused in the component 200 to be cut by a negative pressure force. Thereby, the yield rate can be improved, and the service life of the product can be prolonged.

Optionally, the component 200 to be cut can be cut by the laser emitter along a center line of the cutting region 40. In other words, the cutting line can be located at the central line of the cutting region 40.

What described above are only specific embodiments of the present disclosure, but the protection scope thereof is not limited thereto. Any variation or substitution, easily conceivable within the technical range disclosed in the present disclosure for a skilled person who is familiar with this technical field, shall fall within the protection scope of the present disclosure. Therefore, the protection scope of the present disclosure shall be subject to the protection scope of the claims.

The invention claimed is:

1. An abutment, comprising a carrying region for placing a component to be cut thereon, the carrying region comprising an adsorbing region and a cutting region, wherein
    the adsorbing region is provided with adsorbing holes for adsorbing the component to be cut, and
    the cutting region extends from a side of the carrying region to an opposite side thereof, wherein the cutting region is also provided with further adsorbing holes, wherein all the adsorbing holes in the adsorbing region and the cutting region are arranged in rows and columns, and the abutment further comprises a peripheral region at the periphery of the carrying region, wherein the peripheral region is provided with first retractable baffles and second retractable baffles, wherein each of the first retractable baffles is used for shielding a corresponding row of adsorbing holes in an unfolded state, a retraction direction of each of the first retractable baffles is aligned with a direction of the corresponding row of adsorbing holes, and each of the second retractable baffles is used for shielding a corresponding column of adsorbing holes in an unfolded state, a retraction direction of each of the second retractable baffles is aligned with a direction of the corresponding column of adsorbing holes, wherein the peripheral region is free of adsorbing holes, the first and the second retractable baffles are respectively configured such that when the component to be cut is cut, a retractable baffle corresponding to the cutting region is in an unfolded state, while retractable baffles at other positions are still in a folded state, and wherein the first retractable baffles and the second retractable baffles are all arranged at a side of the abutment away from the component to be cut, a length of the first retractable baffles in the unfolded state is greater than a length of the first retractable baffles in the folded state, a length of the second retractable baffles in the unfolded state is greater than a length of the second retractable baffles in the folded state.

2. The abutment according to claim 1, wherein
the adsorbing holes in each adsorbing region are arranged uniformly.

3. The abutment according to claim 1, wherein
a distance between the cutting region and a center of an adsorbing hole in the adsorbing region adjacent to the cutting region is greater than a radius of the adsorbing hole by at least 1 mm.

4. The abutment according to claim 1, wherein
each of the first retractable baffles comprises a plurality of first sub-retractable baffles connected in series, wherein adjacent ones of the first sub-retractable baffles are connected with each other via a first connection structure, and each of the second retractable baffles comprises a plurality of second sub-retractable baffles connected in series, wherein adjacent ones of the second sub-retractable baffles are connected with each other via a second connection structure.

5. The abutment according to claim 1, wherein
all the adsorbing holes in the adsorbing region and the cutting region are arranged uniformly.

6. The abutment according to claim 1, wherein
the first retractable baffles and the second retractable baffles are all located on an outer surface of the abutment.

7. The abutment according to claim 1, wherein
all of the first retractable baffles and the second retractable baffles have a width of smaller than 10 mm.

* * * * *